No. 734,513. PATENTED JULY 28, 1903.
G. V. CLARK.
TELLURIAN.
APPLICATION FILED FEB. 13, 1902.
NO MODEL.
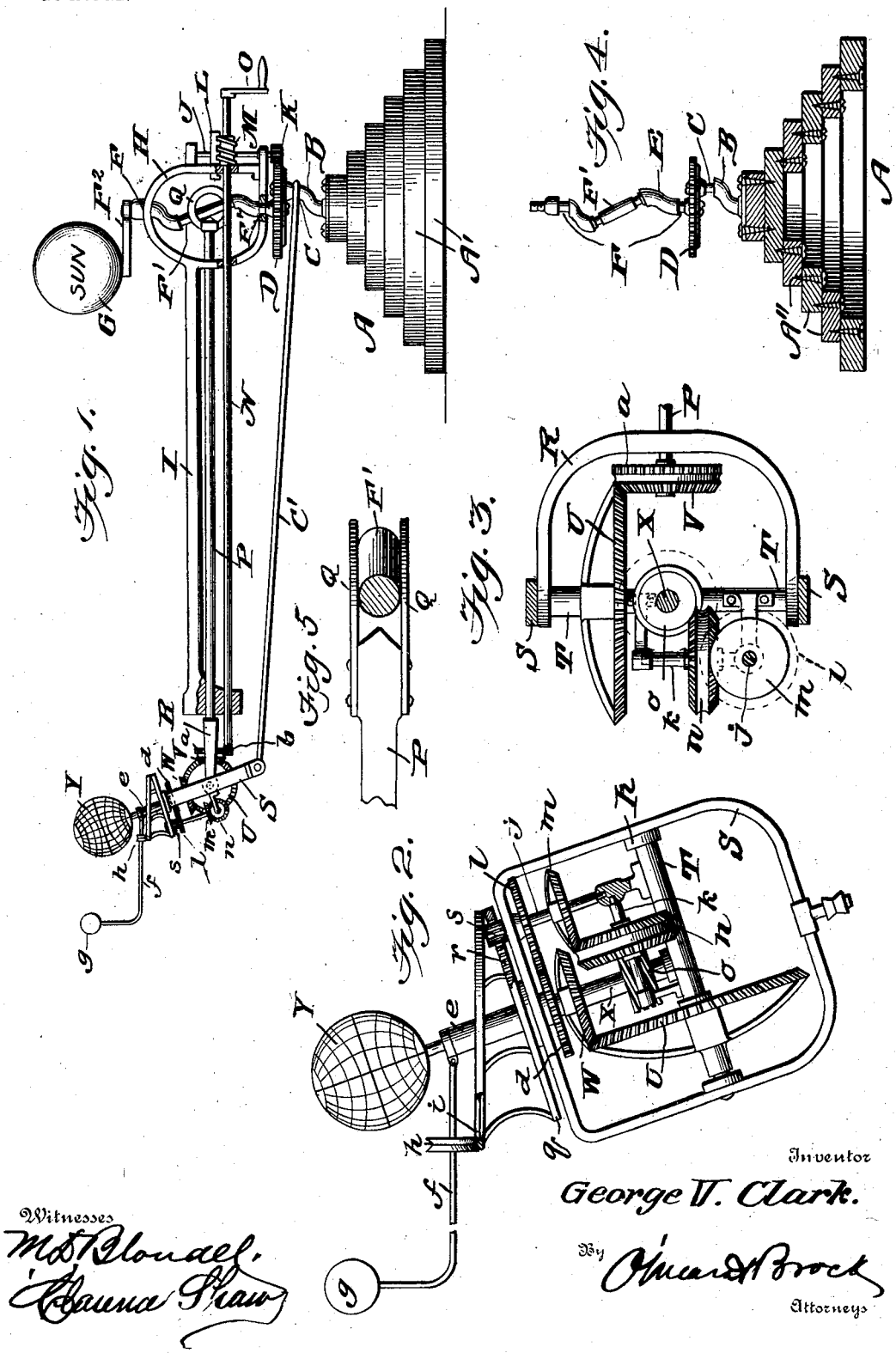

No. 734,513. Patented July 28, 1903.

UNITED STATES PATENT OFFICE.

GEORGE V. CLARK, OF WEST CARLISLE, OHIO.

TELLURIAN.

SPECIFICATION forming part of Letters Patent No. 734,513, dated July 28, 1903.

Application filed February 13, 1902. Serial No. 93,972. (No model.)

*To all whom it may concern:*

Be it known that I, GEORGE V. CLARK, a citizen of the United States, residing at West Carlisle, in the county of Coshocton and State of Ohio, have invented a new and useful Tellurian, of which the following is a specification.

This invention is an improved construction of tellurian, the object being to provide a device which shall be cheap and simple in construction and easy and accurate in operation.

With these objects in view the invention consists in the novel features of construction and combination hereinafter fully described, and pointed out in the claims.

In the drawings forming part of this specification, Figure 1 is a side elevation of a tellurian constructed in accordance with my invention. Fig. 2 is a view illustrating the frame carrying the earth and also the gearing for operating the same. Fig. 3 is a view, partly in section and partly in plan, illustrating the connection between the operating-shaft and operating-gear. Fig. 4 is a sectional view illustrating the construction of the base. Fig. 5 is a detail plan view showing the rings Q and their relation with the angled bearing portion F'.

In carrying out my invention I employ a base A, composed of a series of rings A' and one or more disks arranged upon the uppermost ring. Extending upwardly from the base is an arm B, reduced to form a bearing C near its upper end. The shape of this arm is such that the bearing C is disposed eccentrically with respect to the base. Eccentrically mounted upon the upper end of the arm B is a toothed disk D, and mounted centrally upon the said toothed disk is a second arm E, formed adjacent to its upper and lower ends with reduced bearing portions F, the portion F' between said bearings being arranged at an angle of twenty-three and one-half degrees with respect to the bearings at the upper and lower end of the shaft. Secured upon the upper end of this crank-shaft is the horizontal arm F², upon which is mounted a globe G representing the sun. Mounted upon the arm E by engaging the bearing portions F is a frame H, which is adapted to rotate about said shaft and carries a horizontally-extended supporting-arm I, and mounted in the frame H is a vertical shaft J, carrying a pinion K at its lower end, which meshes with the toothed disk D. This shaft also carries a worm-gear L, which meshes with the worm M, mounted upon an operating-shaft N, which is journaled in the frame H, the outer end of said operating-shaft having a crank-handle O attached thereto. By rotating the shaft the arm I and frame are caused to rotate about the disk D, as will be readily understood.

P designates a shaft, which at its outer end is supported by the outer end of the arm I and at its inner end is centered on the oblique portion F' of the shaft E, being retained by two rims Q, which are secured to the arm and extend on opposite sides of said portion F', which is reduced, as illustrated in Fig. 4, and said rings are of such size as to fit between the shoulders at the respective ends of said reduced portions. The rings Q are not secured to the portion F'; but as the arm I, which supports the arm P, revolves around the base, carrying the arm P with it, the rings Q hug the portion F' and rotate around it with a peculiar twisting movement caused by the angle of the arm, and the object of this twisting movement will appear later. The outer end of the shaft P projects from the outer end of the arm I and has a yoke R rigidly secured thereto, the legs of which are pivoted to the frame S intermediate of its ends, which frame supports the globes representing the earth and moon, hereinafter described. Extending transversely of the frame intermediate its ends is fixed a shaft T, carrying gear-wheel U. This gear meshes with the beveled gear V, loose upon the end of the shaft P, which projects to the inner side of the yoke. This gear U also meshes with the beveled gear W, fast upon the shaft X, which projects through the upper portion of the frame S and in which it is journaled intermediate its ends, and at its lower end has a bearing in the shaft T. A globe Y, which represents the earth, is secured to the projecting end of this shaft. The bevel-gear V also has a gear *a* attached thereto, which meshes with the pinion *b* on the outer end of the operating-shaft, so that as the said shaft is operated the earth is moved around the sun and at the same time is rotated upon its axis. A rod C' is pivotally connected at its outer end to the lower end of the frame S and at its inner end is pivotally connected to the eccentric bearing C, formed upon the arm B. As the globe representing the earth is moved around the globe representing the sun the distance of the former from the latter is varied through the medium of the rod C' and likewise through the medium of the arm F², and the rod C' also serves to shift the angle of inclination of the earth's axis with reference to the axis of the sun; but the shaft X, which also serves as the axis of the earth, is always parallel to the portion F', which is always at an angle of twenty-three and one-half degrees to the axis of the sun, and this result is produced by the twisting movement of the rings Q, and for convenience we will term the tilting movement given by the arm C' a "longitudinal" movement, the movement of the lower part of the frame S being toward and away from the base A or arm B, while the movement due to the turning of the rings Q about the arm F will be termed a "horizontal" movement, the movement being a side movement compared with the tilting longitudinal movement, and the two movements being simultaneous and continuous and their combined effect being to constantly change the inclination of the axis of the earth to that of the sun, but at the same time to keep the axis of the earth parallel with the angled portion F' of the arm as it revolves around the sun-globe.

d designates a gear which is loose upon the shaft X and has a sleeve e surrounding the said shaft and projecting above the upper end of the frame S, and pivoted to the said sleeve is an arm f, carrying at its outer end a globe g, representing the moon, and loosely mounted upon said shaft near its pivotal end is a beveled disk h, which moves upon a circular track i, secured upon the top bar of the frame S, said track being arranged at an inclination to the shaft supporting the earth, and as the earth is rotated upon its axis and revolved about the sun the position of the moon with reference to the earth is shifted through the medium of the relatively inclined track, so that the moon always occupies the proper position with relation to the earth.

Supported by the frame S are two shafts j and k, disposed at right angles to each other, the former having a gear l at its upper end, which meshes with the gear d, and a beveled gear m at its lower end, which meshes with one side of the double beveled gear n, the opposite side of the said gear n meshing with the worm-gear o, fixed upon the shaft X, and through the medium of this construction the moon is also rotated about the earth when the driving-shaft is operated. The circular inclined track i above referred to is supported on a ring q, having teeth r on its inner side and engaged by a pinion s, carried on the upper part of the shaft j, and while the moon will be rotated by the sleeve e about the earth twelve times while the earth is rotated about the sun once the track and ring q is rotated once during three revolutions of the earth around the sun, and thus the moon is brought back to its original position, the position in which it stood when the operation of the device was commenced, and by this arrangement the moon will make twelve and one-third revolutions about the earth during each period representing one year, and at the same time preserve its proper inclination through the shifting of the track on which it travels. When the driving-shaft is operated, the earth is rotated upon its axis and is, furthermore, caused to revolve about the sun, and during such revolution of the earth about the sun it is brought close to the sun and moved away from the same at the proper times.

It will thus be seen that I provide a simple and efficient construction of tellurian capable of clearly illustrating the movement of the sun, earth, and moon.

Having thus fully described my invention, what I claim as new, and desire to secure by Letters Patent of the United States, is—

1. A tellurian comprising an arm carrying a sun-globe said arm having a portion arranged at an angle of twenty-three and one-half degrees to the axis of the sun-globe, an earth-globe adapted to rotate about the sun-globe and means for maintaining the axis of the earth-globe parallel to the angled portion of the arm carrying the sun-globe.

2. A tellurian comprising an arm carrying a sun-globe said arm having a bent portion at an angle of twenty-three and one-half degrees to the axis of the sun-globe, an earth-globe carried in a frame adapted to rotate about the sun-globe, a shaft connected to the frame, and parallel rings secured at the inner end of said arm and adapted to inclose the bent portion of the shaft and hold the axis of the earth parallel to said bent portion.

3. In a tellurian, the combination with a suitable base of an arm having a bent portion mounted on the base, a sun-globe thereon, a horizontal arm connected at the inner end to the bent arm and having a frame at its outer end, means for revolving the frame around the base, a shaft journaled in said frame, an earth-globe mounted on the shaft above the frame, an inclined track surrounding said shaft, a moon-globe, supported from said track, means for rotating the track relative to the movement of the moon-globe, and a tilting arm secured at one end to the arm on the base and at the opposite end to the frame and adapted to vary the inclination of same as the frame is revolved around the base.

GEORGE V. CLARK.

Witnesses:
EDWIN S. EDWARDS,
S. F. CHANEY.